(12) United States Patent
Wolber

(10) Patent No.: US 7,262,878 B2
(45) Date of Patent: Aug. 28, 2007

(54) SYSTEM AND METHOD FOR CALIBRATING AN IMAGING SYSTEM DURING IMAGING

(75) Inventor: John W. Wolber, Nashua, NH (US)

(73) Assignee: Agfa Corporation, Wilmington, MA (US)

( * ) Notice: Subject to any disclaimer, the term of this patent is extended or adjusted under 35 U.S.C. 154(b) by 1113 days.

(21) Appl. No.: 10/230,536

(22) Filed: Aug. 29, 2002

(65) Prior Publication Data

US 2004/0041078 A1    Mar. 4, 2004

(51) Int. Cl.
- H04N 1/036 (2006.01)
- B41J 2/435 (2006.01)
- G01D 18/00 (2006.01)

(52) U.S. Cl. ............ 358/1.7; 358/1.12; 358/406; 347/264

(58) Field of Classification Search ........... 358/1.9, 358/1.12, 3.24, 3.26, 504, 406, 296, 461, 358/463, 474, 483, 1.5, 1.7; 347/262, 264
See application file for complete search history.

(56) References Cited

U.S. PATENT DOCUMENTS 5,047,652 A * 9/1991 Lisnyansky et al. ... 250/559.01
5,185,673 A * 2/1993 Sobol ..................... 358/1.9

FOREIGN PATENT DOCUMENTS

EP    0599482    6/1994

* cited by examiner

Primary Examiner—Scott A. Rogers
(74) Attorney, Agent, or Firm—Robert A. Sabourin

(57) ABSTRACT

An imaging system is disclosed for imaging recording media. The imaging system includes an input opening through which recording media may be input to the imaging system, and an imaging unit for imaging the recording media that is received through the input opening. The imaging unit provides a calibration image on the recording media. The imaging system also includes a calibration image receiving unit for receiving image data representative of the calibration image. The calibration image receiving unit produces imaging unit calibration adjustment data. The imaging system also includes an imaging unit adjustment controller, and an output opening. The imaging unit adjustment controller adjusts the imaging unit responsive to the imaging unit calibration adjustment data. The recording media exits the imaging system through the output opening.

12 Claims, 5 Drawing Sheets

SYSTEM AND METHOD FOR CALIBRATING AN IMAGING SYSTEM DURING IMAGING

BACKGROUND OF THE INVENTION

The invention generally relates to the field of imaging systems, and specifically relates to systems and methods for providing plates (e.g., lithographic or flexographic plates) in a plate making system.

In many pre-press imaging systems, such as imagesetters or platesetters, a plurality of sheets or plates (hereafter referred to as plates) of recording media are separately exposed by an imaging source. Each plate may provide a pattern for a different color (e.g., yellow, magenta, cyan and possibly black), and these plates must be registered with one another during printing of the final multi-color image. The recording media to be imaged by a pre-press imaging system is commonly supplied in web form or in discrete plates. The recording media may include photosensitive material, radiation sensitive material, thermally sensitive material, or any other type of imageable material.

During imaging, a movable optical carriage is typically used to displace a laser system or other imaging source in a slow scan direction along a stationary or moving, curved or planar, media support surface (e.g., an external drum, and internal drum, a flatbed, or other support surface). The imaging source exposes a supply or recording media supported on, and held against, the media support surface. Generally, the imaging source includes an optical system for scanning one or more lasers or other radiation beams, each modulated by a digital information signal, over the recording media to record an image onto the recording media. Generally, the information signal is recorded onto a supply of recording media mounted about the external drum by displacing the imaging source relative to the media support surface, e.g., an external drum. This may be accomplished in a number of ways, including rotation of the external drum in combination with a lateral translation of the imaging source, etc. In certain systems, the external drum is rotated while the imaging source is displaced in discrete steps or continuously along the length of the external drum to record data onto the recording media.

Calibration of the imaging system is typically performed during a set-up procedure that occurs either at the manufacturer or at a user's site. Calibration typically involves analyzing an imaged plate after the plate has been processed by a chemical processor that is used to develop the image on the plate.

There is a need, therefore, for an improved system and method for calibrating imaging systems, and in particular, for calibrating pre-press imaging systems responsive to variations in imaging media.

SUMMARY OF THE INVENTION

The invention provides an imaging system for imaging recording media. In an embodiment, the imaging system includes an input opening through which recording media may be input to the imaging system, and an imaging unit for imaging the recording media that is received through the input opening. The imaging unit provides a calibration image on the recording media. The imaging system also includes a calibration image receiving unit for receiving image data representative of the calibration image. The calibration image receiving unit produces imaging unit calibration adjustment data. The imaging system also includes an imaging unit adjustment controller, and an output opening. The imaging unit adjustment controller adjusts the imaging unit responsive to the imaging unit calibration adjustment data. The recording media exits the imaging system through the output opening.

BRIEF DESCRIPTION OF THE DRAWINGS

The following description may be further understood with reference to the accompanying drawings in which.

Figure 1:
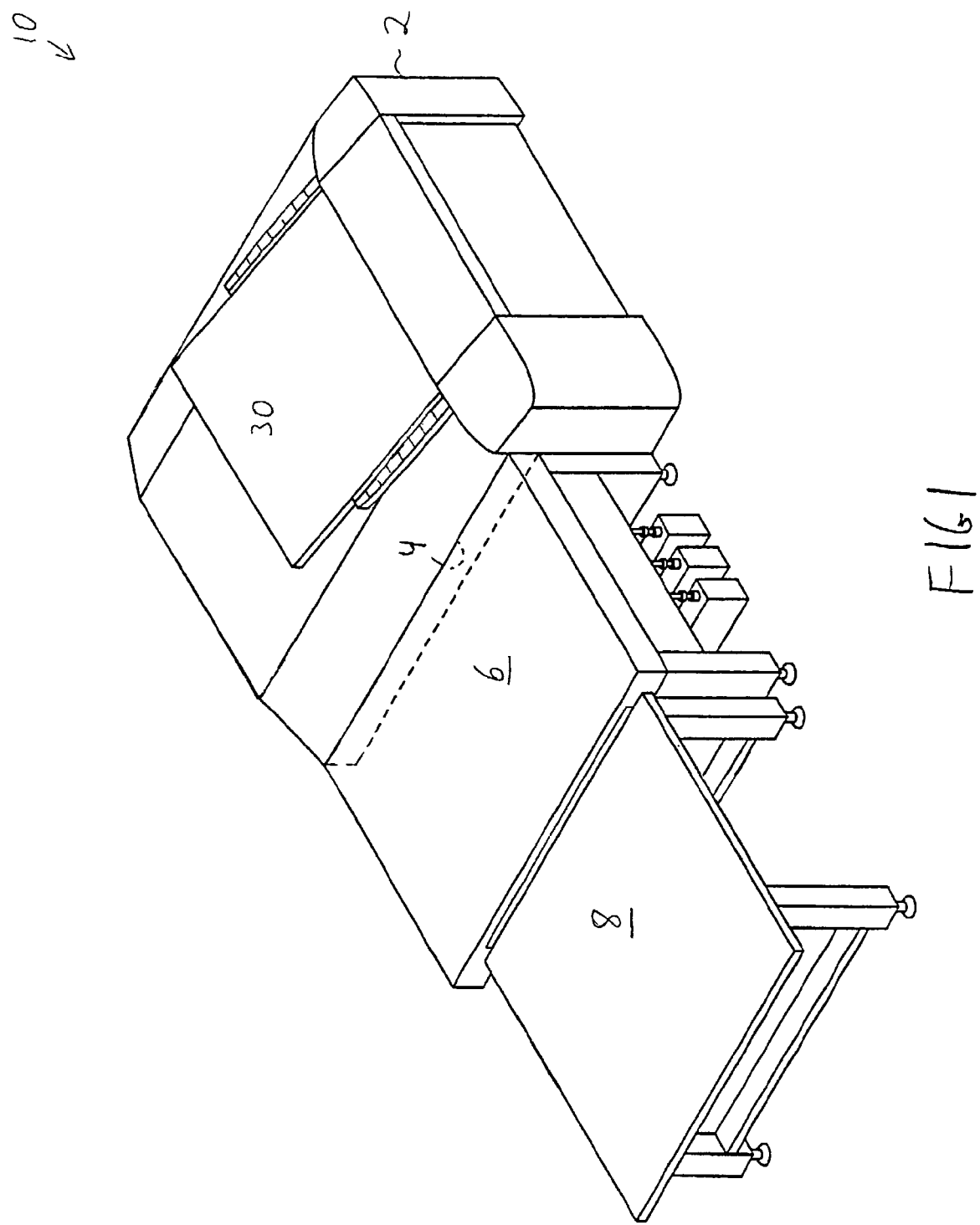
FIG. 1 shows an illustrative isometric view of an external drum imaging system of the invention together with a processing station and an output table.

The drawings are shown for illustrative purposes only, and are not to scale.

DETAILED DESCRIPTION OF THE INVENTION

An embodiment of a system of the invention is illustrated in the accompanying drawings, wherein like reference numerals refer to like elements throughout the drawings. Although the drawings are intended to illustrate an embodiment of the present invention, the drawings are not necessarily drawn to scale.

A calibration system of the invention may be used with an external drum imaging system that is configured to record digital data onto imaging media. Although described below with regard to an external drum platesetter, many aspects of the present invention may be used in conjunction with a wide variety of other types of external drum, internal drum, or flatbed imaging systems, including imagesetters and the like, without departing from the intended scope of the present invention.

As shown in FIG. 1, in accordance with an embodiment of the invention, imaging media may be placed onto an input tray 30 of an image recorder, such as a platesetter 10 having a housing 2. The imaging media is then imaged, and a portion of the imaged media may then be scanned by a calibration unit. The imaging system may then be adjusted responsive to the output of the calibration unit, and imaging of the media may continue. The media is then output from the platesetter 10 via output port 4, passed to a processing station 6, and then deposited onto a table 8 as shown in FIG. 1.

The imaging system generally includes a front end computer or workstation (not shown) for the design, layout, editing, and/or processing of digital files representing pages to be printed, a raster image processor (RIP) for further processing the digital pages to provide rasterized page data (e.g., rasterized digital files) for driving an image recorder, and an image recorder, such as an external drum platesetter 10, for recording the rasterized digital files onto a printing plate or other recording media. The external drum platesetter 10 records the digital data provided by the RIP onto a supply of photosensitive, radiation sensitive, thermally sensitive, flexographic or other type of suitable printing plate. In the present embodiment, the printing plate is manually loaded onto a staging area of the external drum platesetter 10 by an operator. Alternately, or in addition to manual loading, the printing plate may be provided and loaded onto the external drum platesetter 10 by a media supply or autoloading system, which may accept a plurality of the same size or different size printing plates.

Figure 2:
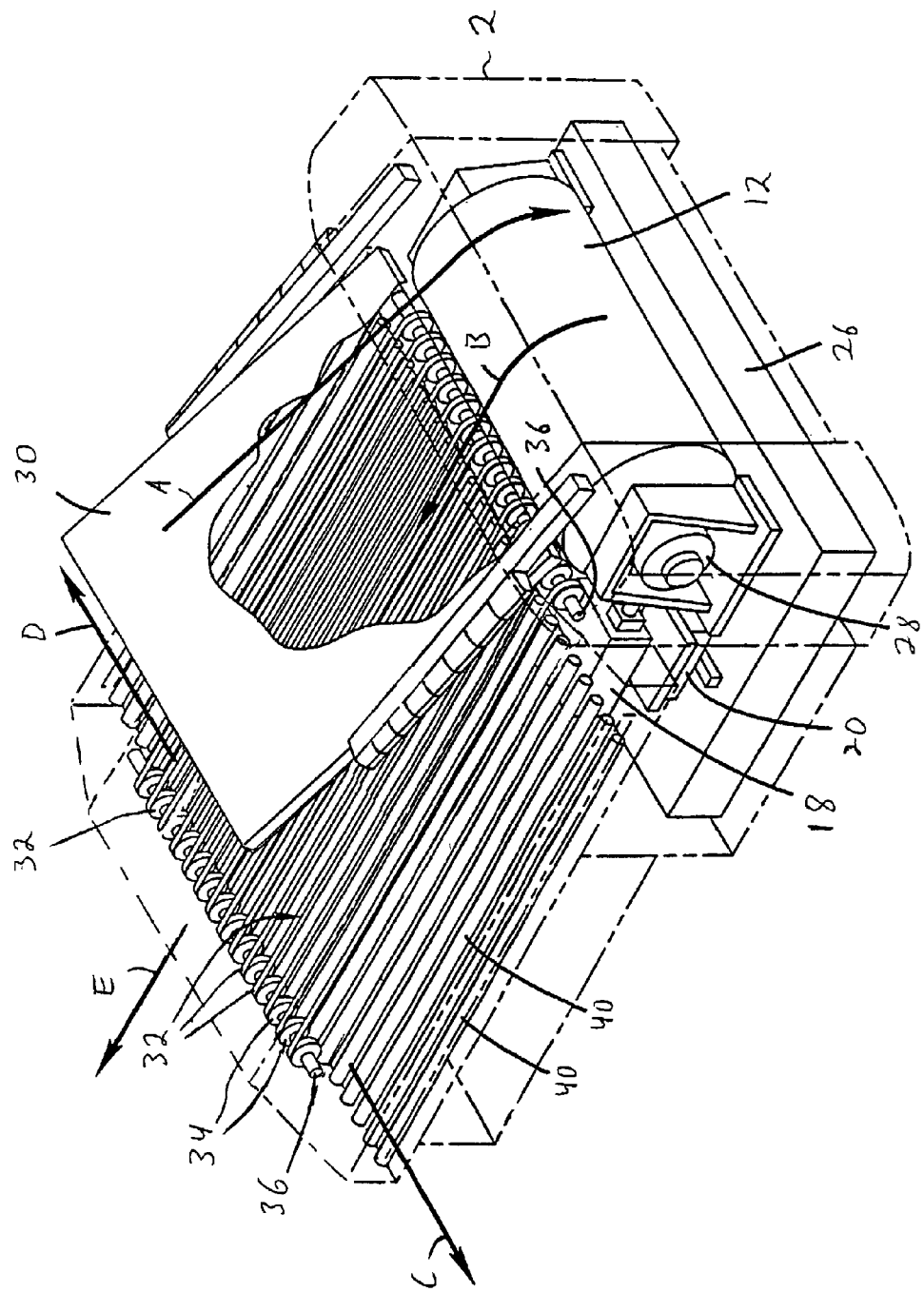
FIG. 2 shows an illustrative isometric view of an external drum imaging system in accordance with the invention with the housing removed.

As shown in FIG. 2, the external drum platesetter 10 includes an external drum 12 having a cylindrical media support surface 14 for supporting the printing plate 16 (shown in FIG. 3) during imaging. The external drum platesetter 10 further includes a writing and calibration system 18, coupled to a movable carriage 20, for recording digital data onto the imaging surface 22 of the printing plate 16 using a single or multiple imaging beams 24 (shown in FIG. 2). The carriage 20 rides along a stable base 26, and the drum 12 rotates about a drum drive system 28. The base 26 may be formed of heavy material, such as a polymer-concrete mixture, granite, or the like, to vibrationally isolate the external drum 12 and writing and calibration unit 18 from external vibrations.

Generally, during use a plate is positioned on an input tray 30, and transferred to an imaging station in a direction as indicated at A. After imaging, the plate is transferred from the imaging station to an output tray in a direction as indicated at B using transfer belts 32 that are driven by pulleys 34 about pulley shafts 36. From the output tray, the plate may be exited from the platesetter 10 in either of a direction as indicated at C or a direction as indicated at D by rollers 40 that contact the plate after the pulleys 34 and belts 32 are lowered with respect to the rollers 40. In further embodiments, the plate may be exited from the platesetter 10 in a direction as indicated at E.

As shown in FIG. 2, the scanning system 18 is displaced by the movable carriage 20 in a slow scan (axial) direction along the length of the rotating external drum 12 to expose the printing plate 16 in a line-wise manner when a single beam is used or in a section-wise manner for multiple beams. Other types of imaging systems may also be used in the present invention. The external drum 12 is rotated by a drive system 28 in a clockwise or counterclockwise fast scan direction, typically at a rate of about 100-1000 rpm. In an embodiment, the printing plate 16 is loaded onto the external drum 12 while rotating the drum in a first clockwise direction. The printing plate 16 is then imaged while the drum is rotated in the first, or in an opposite second, direction. Finally, the printing plate 16 is unloaded from the external drum 12 while rotating the drum in the second direction.

Figure 3:
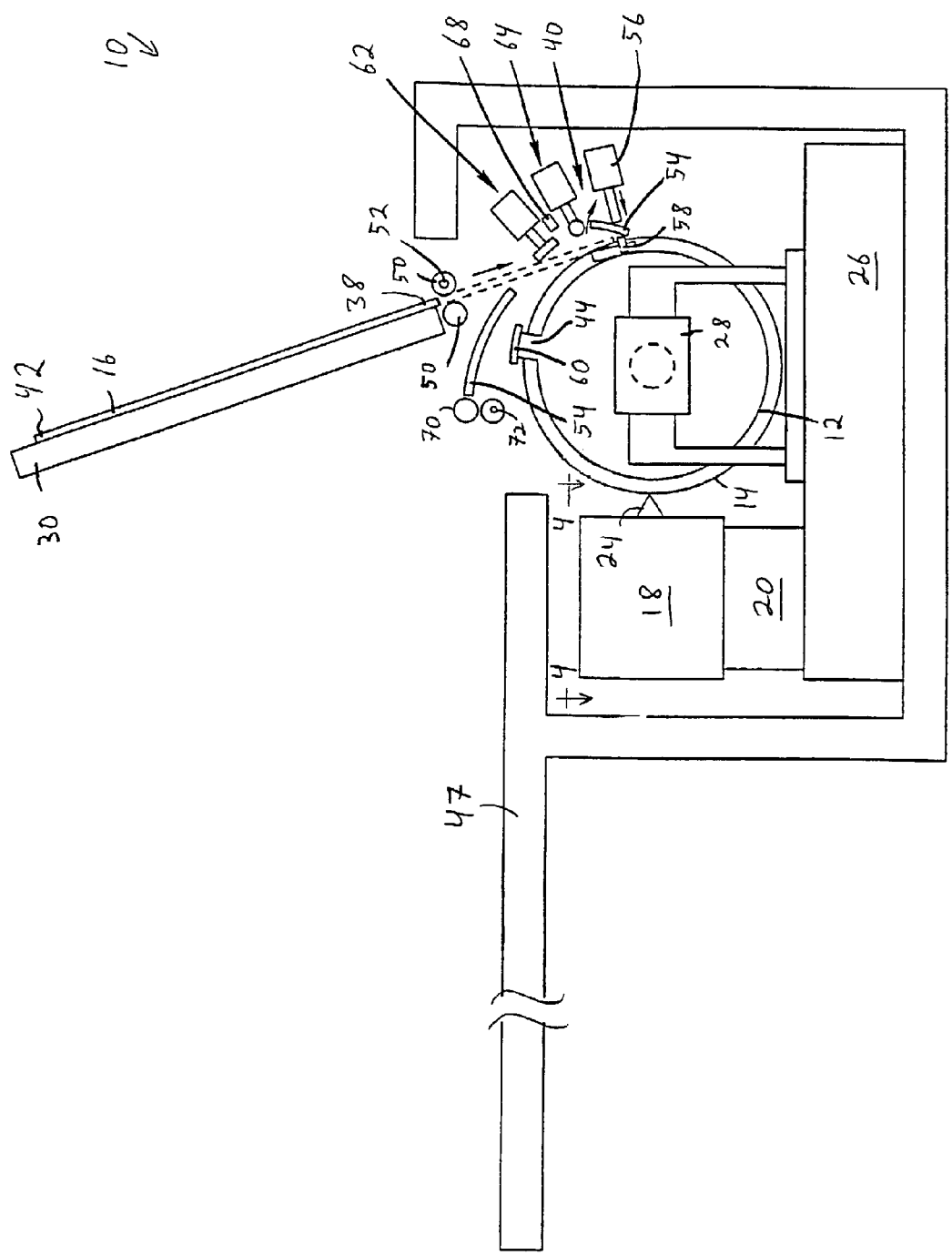
FIG. 3 shows an illustrative side view of the imaging system of FIG. 1 with the housing removed.

As shown in FIG. 3, a plate 16 is positioned on the input tray 30 above a pair of resilient input nip rollers 50, one of which may be driven by a drive assembly 52. The leading edge 38 of the plate 16 is positioned by the input tray 30 to rest substantially between the input nip rollers 50. The rollers 50 are positioned above the external drum 12, and are oriented such that the common tangent of the rollers 50 is tangent to the media support surface 14. The input tray 30 is oriented such that the loading path of the plate 16 extends along a line that is tangent to the external drum 12 at a leading edge clamping mechanism 40.

A curved input/output guide platen 54, mounted to a frame member (not shown) of the external drum platesetter 10 may be provided to direct the leading edge 38 of the printing plate 16 toward the leading edge clamping mechanism 40 during the loading of the printing plate 16 onto the external drum 12. In addition, the curved input/output guide platen 54 is configured to direct the printing plate 16 off of the external drum 12 toward the plate output area after imaging is complete.

During loading of a plate 16, the drum 12 is rotated until the leading edge clamping mechanism 40 is positioned to receive the leading edge 38 of the plate 16. A clamping portion 54 of the clamping mechanism 40 is held in an open position by an actuator 56, exposing registration pins 58. A trailing edge clamping mechanism 44 is rotated by the drive system 28, if necessary, to position a clamping bar 60 out of the way of the loading path of the plate 16. An actuation system 62 for the trailing edge clamping mechanism 44, and an ironing roller system 64, may also be retracted away from the media support surface 14 of the external drum 12 out of the way of the loading path. After the leading edge 38 of the plate 16 is properly positioned against the registration pins 58, the leading edge clamping mechanism is closed, thereby pinching the plate 16 against the external drum 12 while the leading edge 38 remains in contact with the registration pins 58.

After the leading edge clamping operation, the external drum 12 is rotated a few degrees by the drive system 28. The ironing roller assembly of the stationary ironing roller system 64 is then extended and positioned against the plate 16 by an actuating system. The plate is drawn around the drum 12 until the trailing edge 42 of the plate 16 is positioned adjacent the trailing edge clamping mechanism 44. The clamping bar 60 is then positioned over the trailing edge 42 of the plate 16. If the size of the plate is not known and pre-programmed into the system, a sensor 68 may be used to detect the trailing edge of the plate 16. The drum and clamping bar 60 are then rotated together, and the clamping bar 60, which is normally biased away from the drum 12, is then forced against the drum 12 by the actuation system 62. Vacuum may also be used to facilitate securing the plate to the drum.

During imaging, the leading edge 38 of the plate 16 is held in position against the media support surface 14 by the leading edge clamping mechanism 40. Similarly, the trailing edge 42 of the printing plate 16 is held in position against the media support surface 14 by the trailing edge clamping mechanism 44. Both the trailing edge clamping mechanism 44 and the leading edge clamping mechanism 40 provide a tangential friction force between the printing plate 16 and the external drum 12 sufficient to resist the tendency of the edges of the printing plate 16 to pull out of the clamping mechanisms 40, 44, at a high drum rotational speed. In accordance with the present invention, only a small section (e.g., 6 mm) of the leading and trailing edges 38, 42, is held against the external drum 12 by the leading and trailing edge clamping mechanisms 40, 44, thereby preserving as much of the available imaging area of the printing plate 16 as possible.

Figure 4:
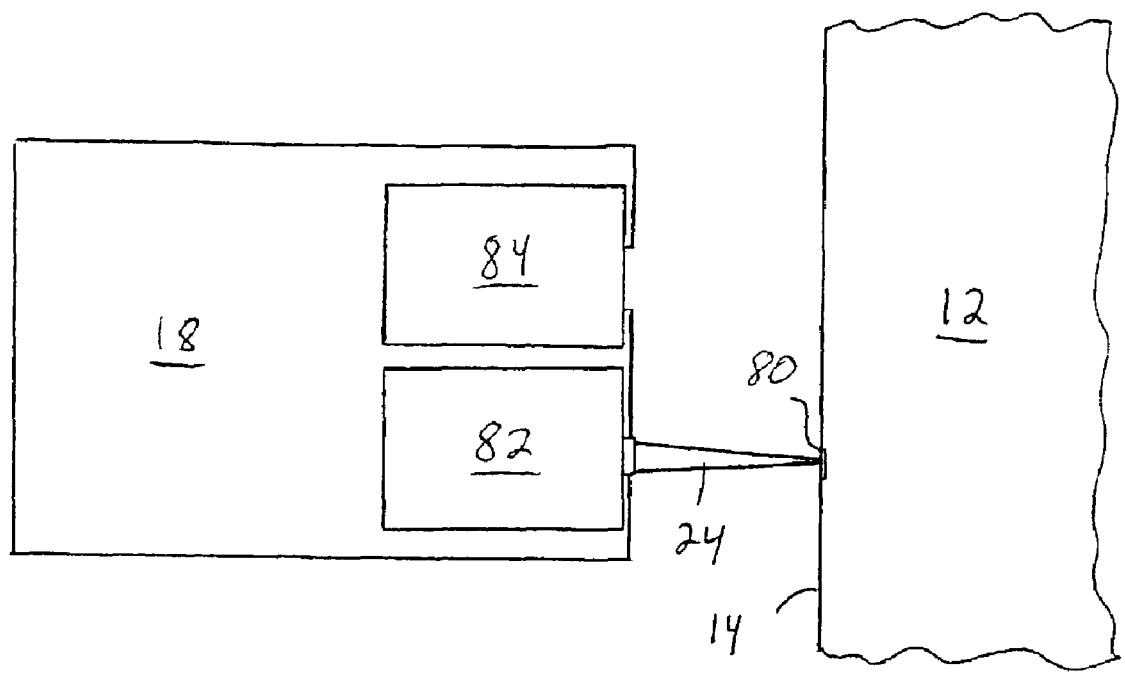
FIG. 4 shows an illustrative top view of the writing and calibration system of FIG. 2 taken along line 4-4 thereof during writing.
Figure 5:
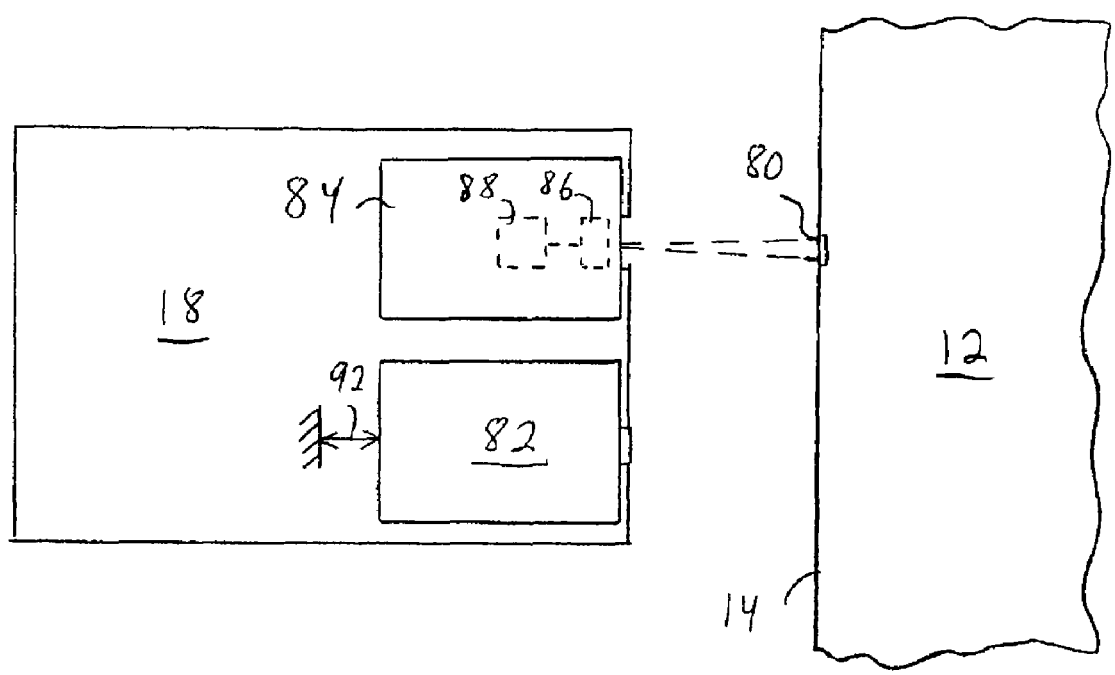
FIG. 5 shows an illustrative top view of the writing and calibration system of FIG. 4 during calibration.

As shown in FIG. 4, a calibration image 80 is recorded on a portion of the surface 14 of the imaging media 12 by a writing illumination source 82 of the writing and calibration unit 18. The calibration image 80 may then be viewed by a calibration detection unit 84 within the unit 18 as shown in FIG. 5. The calibration detection unit 84 may include, in particular, a dispersing filter 86 and a charge couple device (CCD) camera 88.

Figure 6A:
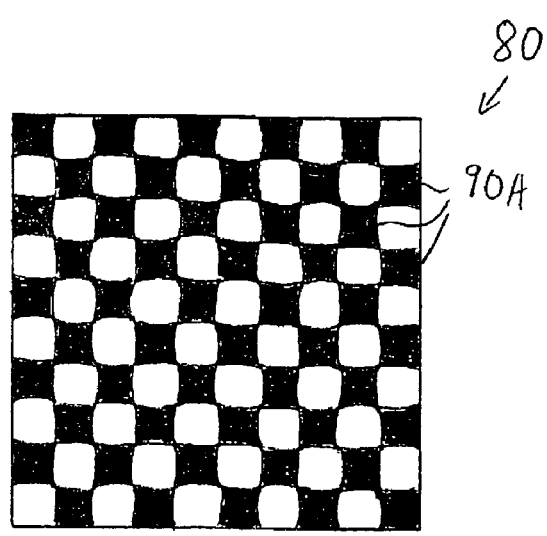
FIGS. 6A-6C show illustrative diagrammatic views a calibration image in accordance with an embodiment of the invention.
Figure 6B:
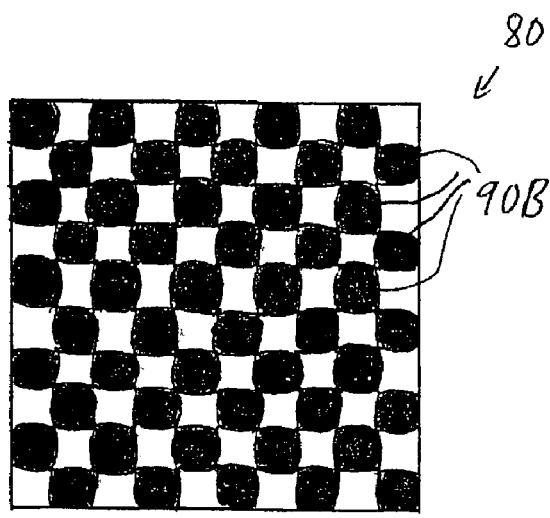
Figure 6C:
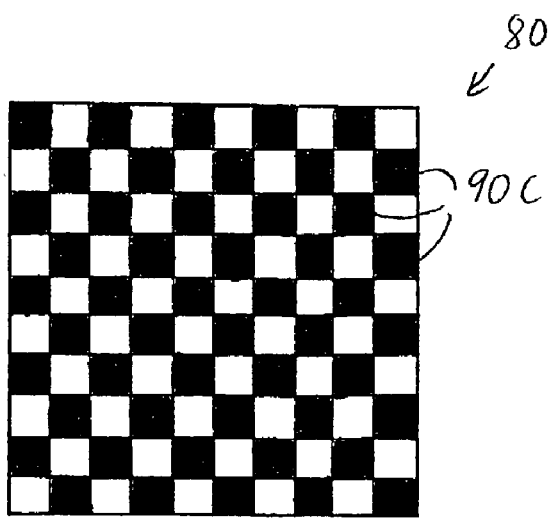

As shown in FIGS. 6A and 6B, the calibration image 80 may include an checkerboard-type array of black and white boxes, and may, for example be about 1 inch by 1 inch in size. If the writing source 82 is improperly calibrated, then the individual boxes 90 may be slightly undersized as shown at 90A in FIG. 6A, or slightly oversized as shown at 90B in FIG. 6B. Because the calibration detection unit 84 includes a dispersing filter 86, the CCD camera 88 receives a blurred homogenous image of the calibration image 80, rather than distinguishing between individual boxes. The blurred homogenous image will be recorded by the CCD camera and accompanying computer system as a shade having a particular shade value. If the calibration image includes undersized boxes as shown at 90A in FIG. 6A, then the shade value of the image received by the CCD camera 84 will be lower than a desired target shade value. If the calibration image includes oversized boxes as shown at 90B in FIG. 6B, then the shade value of the image received by the CCD camera 84 will be higher than the desired target shade value. Finally, if the calibration image includes correctly-sized boxes as shown at 90C in FIG. 6C, then the shade value of the image received by the CCD camera 84 will be equal to the desired target shade value. The position of the writing unit 82 may then be adjusted as indicated at 92 in FIG. 5 responsive to the shade value of the received image to achieve an optimal calibration for that particular imaging media. In various embodiments, the system may adjust to any shade value, e.g., 50% as described above, or any value between 0% and 100%. Further, the system may record and analyze either the brightness (the white areas) and/or the dark areas, and may record the brightness/darkness for a variety of shades (e.g., 25%, 50% and 75%) and provide the appropriate (linear or non-linear) correction as needed. In other embodiments, the system may not blur the image, but rather may record the actual shapes (e.g., each square shape) in the calibration image. Moreover, the calibration image may form a part of the overall image being recorded on the plate.

The calibration image may be written on a small portion of the media near an edge in order to preserve as much of the media as possible for imaging of the desired image during pre-press imaging. In further embodiments, the calibration image may be written over a large portion of imaging media that is used only for the calibration process.

With reference again to FIG. 3, during output of the plate 16 from the drum 12, the drive system 28 rotates the drum 12 in a counterclockwise direction, the trailing edge clamping mechanism 44 is released, and the leading edge clamping mechanism 40 is released. The trailing edge 42 of the plate 16 is guided by the input/output platen 54 toward resilient output nip rollers 70, one of which may include a drive system 72. The plate 16 is then received in the output area 47 by the belts 32 that are rotated about pulleys 34 in a direction that causes the top surface of the belts 32 to travel with the plate as it emerges from the imaging area, and thereby carry the plate away from the imaging area. Once the plate reaches a stop surface, the plate stops moving and the drive system for the pulleys 34 is turned off. In other embodiments, plate advancement may cease responsive to the output of a position sensor.

Those skilled in the art will appreciate that numerous modifications and variations may be made to the above disclosed embodiments without departing from the spirit and scope of the present invention.

What is claimed is:

1. A pre-press imaging system for imaging recording media, said imaging system comprising:
   an external drum imaging system for imaging recording media and producing imaged media, said imaged media including a calibration image; and
   a calibration unit for receiving an optical image representative of said calibration image, and for adjusting said external drum imaging system responsive to said received optical image.

2. A pre-press imaging system as claimed in claim 1, wherein said calibration unit includes a charge couple device camera for receiving said optical image.

3. A pre-press imaging system as claimed in claim 1, wherein said calibration unit includes a dispersing filter.

4. A pre-press imaging system as claimed in claim 1, wherein said calibration unit is positioned adjacent said external drum imaging system.

5. An imaging system for imaging recording media, said imaging system comprising:
   input means for receiving recording media input to said imaging system;
   imaging means for imaging said recording media and for providing imaged media including a calibration image, said imaging means comprising a laser writing source whose position with respect to a writing surface is adjusted responsive to an optical image of said calibration image;
   calibration means for adjusting said imaging means responsive to said optical image of said calibration image; and
   output means for providing said imaged media to exit said imaging system.

6. An imaging system as claimed in claim 5, wherein said calibration means further comprises a charge couple device camera.

7. An imaging system as claimed in claim 5, wherein said calibration means comprises a diffusing filter.

8. An imaging system as claimed in claim 5, wherein said calibration image is included on a predetermined portion of said recording media.

9. An imaging system as claimed in claim 5, wherein said imaging means and said calibration means are combined into a writing and calibration unit.

10. A method of imaging recording media in an imaging system, said method comprising the steps of:
    receiving recording media via an input opening in said imaging system;
    imaging said recording media with a writing source to provide imaged media including a calibration image;
    receiving an optical image of said calibration image;
    adjusting said writing source responsive to said received optical image by moving the writing source with respect to said recording media; and
    outputting imaged media from said imaging system.

11. A method as claimed in claim 10, wherein said step of receiving said optical image includes dispersing a detailed image from the calibration image.

12. A method as claimed in claim 10, wherein said steps of imaging, receiving and adjusting occur automatically during the process of imaging said recording media.

* * * * *